May 27, 1952 G. HANSEN 2,598,122
CHECK VALVE
Filed May 12, 1948

Inventor:
George Hansen.
By Joseph O. Lange
Atty.

Patented May 27, 1952

2,598,122

UNITED STATES PATENT OFFICE 2,598,122

CHECK VALVE

George Hansen, Chicago, Ill., assignor to Crane Co., Chicago, Ill., a corporation of Illinois Application May 12, 1948, Serial No. 26,509

10 Claims. (Cl. 251—122)

This invention relates to a check valve. More particularly it is concerned with a novel design of check valve in which a flexible interposed sleeve or collapsible bellows cooperates with the movement of the closure member to provide for closing of the valve.

It is an important object of this invention to provide a composition, rubber or suitable bellows in a check valve in which line fluid pressure allows for the expansion of the bellows or sleeve and permits the fluid to thereby pass through the valve, such passage occurring around or past the disc or closure member.

It is another important object to provide a check valve construction in which the disc cooperates with a stop preferably located in the body or casing to prevent the said disc being closed or moved beyond a predetermined distance when line fluid pressure is applied.

Another important object is to provide for a check valve construction which, when installed in the usual vertical pipe line and a drop in pressure or back flow occurs, the disc will drop by gravity or from its own weight so as to thereby seat while the normally provided tension of the sleeve will thereby form a fluid tight joint around the closure member periphery upon seating of the latter member.

Other objects and advantages will become more readily apparent upon proceeding with the following specifications read in light of the accompanying drawings in which Fig. 1 is a sectional view of a preferred form of my invention.

Similar reference numerals referred to similar parts throughout the several views.

Figure 1:
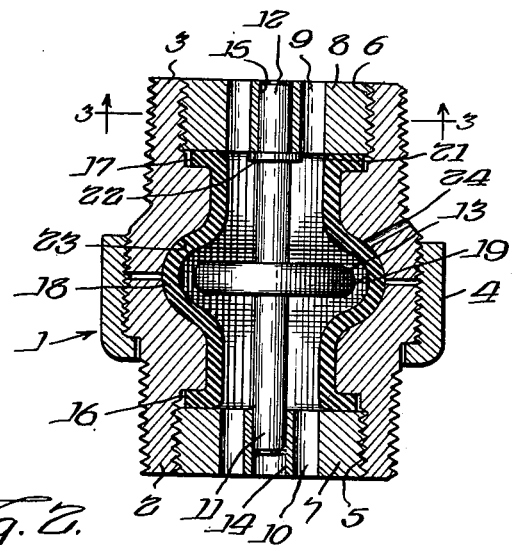
Figure 3:
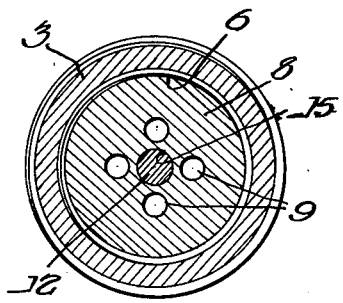
Fig. 3 is a sectional view taken on the line 3—3 of Fig. 1.

Referring now to Fig. 1, the casing generally designated 1 may be integral or consist of the connected parts 2 and 3 respectively constituting the inlet and outlet of the valve as indicated by the arrows. The members 2 and 3 are preferably but not necessarily held together by means of the union ring 4 as shown, the union ring being threaded and shouldered to provide for the desired connection. Preferably at each end of the casing and suitably received and shouldered within the threaded recesses 5 and 6 are the respective spiders 7 and 8 provided with the ports 9 (see Fig. 3) and serving as a journaling guide for the lower and upper stem portions 11 and 12 of the disc or closure member 13. The respective spider members 7 and 8 are suitably apertured as at 14 and 15 to receive the guides 11 and 12, the normal installation requiring that fluid flow or pressure entering the casing be in the direction of the arrows as illustrated.

Figure 2:
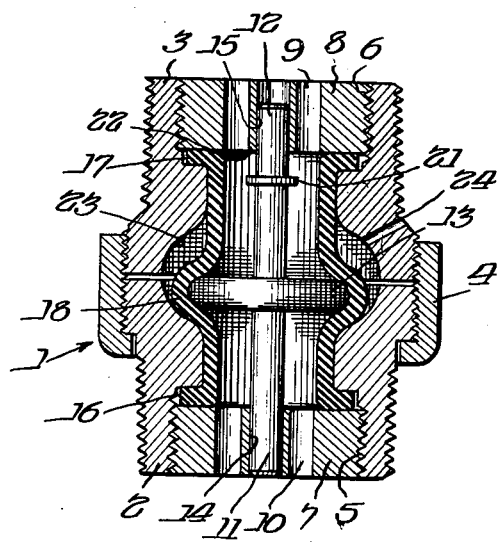
Fig. 2 is a sectional assembly view of the valve shown in Fig. 1 in the closed position.

It is important to note that in assembling the threaded members 7 and 8 within the casing 1 the arrangement is made to clamp therebetween the end flange portions 16 and 17 of the rubber sleeve or bellows 18 as indicated, the normal assembly being made so that the disc is actually forced into the sleeve or bellows 18 as shown in Fig. 2 while the latter member is under tension or being stretched, so that a fluid tight joint is made annularly at 19 around the outer periphery of the valve disc 13 constantly in the absence of line pressure. Thus it will be apparent that when fluid pressure is applied by flow in the direction of the arrows the disc 13 will be moved upwardly until its annular stop 21 shoulders against the spider 8 at the hub 22. At the same time internal pressure or line flow will cause the bellows 18 to be expanded outwardly against the casing inner surface 23 to thereby break contact with the outer periphery of the disc as at 19 and allow line fluid to flow past and around the disc 13, thence through the port openings 9 into the pipe-line (not shown). Thus when line flow ceases or pressure drops sufficiently, the valve closure 13 will drop by its own weight to seat against the inner periphery of the sleeve supported within the casing and the stretched bellows 18 will contract and return to its original position and shape in which it snugly encloses the disc 13 in fluid sealing relation as shown in Fig. 2, thus helping to draw the closure to its seat.

It has been found desirable in order to avoid a possible accumulation of pressures interfering with the action of the sleeve or bellows to provide the vent passage 24 leading to atmosphere. At the same time it will be apparent that the latter passage serves as visual means for observing the action and condition of the bellows 18, without permitting leakage to the outside.

While only one specific embodiment has been shown it should be clear that other modifications may be employed within the spirit of this invention and therefore the limitations upon its scope should be measured by the claims appended hereto.

I claim:

1. A check valve comprising in combination a casing having a flow passage therethrough, a closure member reciprocally movable within said casing and guided at at least an end portion thereof, a collapsible sleeve-type bellows lining a portion of the flow passage of the casing, the said casing having a vent to atmosphere, the said closure member being receivable within said bellows to seat predeterminedly therewithin and provide a relatively snug fit to form a fluid seal therebetween whereby upon the occurrence of predetermined fluid flow within the said casing the said bellows is expanded outwardly and the closure member is moved axially to provide an annular space between the bellows and the closure member for line flow.

2. In a check valve comprising a casing having a flow passage therethrough and formed of a plurality of members, said latter plurality of members forming said casing being joined in fluid sealing relation, a bellows clamped at its opposite ends by said members to constitute a lining for the flow passage of the said casing, a closure member snugly guided by the casing for reciprocal movement within said casing, the said closure member having an outer peripheral portion normally engaged by an inner surface of the said bellows supported by one of the members joined in fluid-sealing relation when the valve is in the closed position, the said casing having a vent to atmosphere, the said casing cooperating with the said bellows to provide for an expansion space for the bellows whereby upon expansion of the bellows an annular flow passage is provided around said closure member.

3. In a check valve comprising a casing having a flow passage therethrough, a bellows positioned within said casing and providing for a lining of the flow passage of the casing when the bellows is subjected to line fluid pressure, a closure member guided by the casing for reciprocal movement within said casing, the said closure member having outer peripheral portions normally engaged solely by an inner annular surface of the said bellows when the valve is in the closed position, the said casing having a vent to atmosphere, the bellows permitting an annular flow passage around said closure member at an enlarged portion of the bellows whereby when pressure is applied to the casing line flow past the closure member and through the bellows is provided at the enlarged portion.

4. A check valve comprising in combination a casing having a flow passage therethrough, a closure member reciprocally movable within said casing, a sleeve-type bellows normally contracted around the closure member and substantially lining a portion of the flow passage of the casing, the said closure member being reciprocably movable within said bellows to provide a snug fit therebetween in the closed position of the valve whereby upon the occurrence of fluid flow within said casing the said bellows is expanded outwardly and the closure member is moved to provide an annular clearance between the said bellows and the closure member, and venting means between the said bellows and casing communicating with atmosphere to permit free expandible movement of the said bellows.

5. In a check valve comprising a casing having a flow passage therethrough and formed of a plurality of sections within the casing and joined in fluid sealing relation, an expandible bellows normally contracted around the closure member and held by the said sections at end portions thereof to line a portion of the flow passage of the casing, the said closure member being reciprocally movable within the said casing, the said closure member having an outer laterally extending peripheral portion normally engaged by the said bellows when the valve is in the closed position, the said casing being vented to atmosphere and providing for an expanding chamber whereby upon expansion of the bellows to contact the limits of the expanding chamber an annular flow passage is provided around the laterally extending portion of the said closure member.

6. A check valve comprising in combination a casing having a flow passage therethrough, a closure member reciprocably movable within said casing, an expandible bellows substantially lining a portion of the flow passage of the casing upon being expanded, the said closure member being normally snugly receivable within an enlarged inner portion of the said bellows to provide a fluid sealing contact therebetween whereby upon the occurrence of fluid flow within said casing the said bellows is expanded outwardly to contact inner surface walls of the casing and the closure member is axially moved limitly to provide an annular passage between the interior of the said bellows and a peripheral portion of the closure member, the said casing being vented to atmosphere whereby upon cessation of fluid flow the closure member moves axially to seat within the casing and the said bellows contracting engages the peripheral portion of the said closure member to seat the latter member within the bellows in fluid sealing relation.

7. In a vertical lift check valve, a casing therefor having a flow-passage therethrough, a reciprocally movable closure member guidedly seated in the said casing, the casing being vented to atmosphere, a distortable sleeve fixedly mounted to line a portion of the flow-passage in the casing and having a stretched portion normally engaging in fluid sealing relation an outer narrow periphery of the said closure member when the valve is in the closed position and being disengageable therefrom when the said closure member is unseated, the said closure member having extension means for guidance by the said casing.

8. A check valve, a body therefor having a flow-passage therethrough, a reciprocally movable closure member having limit stops at each end of its travel, a stretchable sleeve-like bellows mounted within said body to cover a portion of the said flow-passage and snugly fitted normally over a peripheral portion of the said closure member, the said body having vent means to atmosphere, the body providing means cooperating with the limit stops of the closure member, for limiting the axial movement of the closure member in one direction, and the said bellows forming a seat therefor limiting the axial movement of the said closure member in the opposite direction.

9. In a lift check valve construction, a casing therefor, a reciprocally movable closure member guided within the casing having end projecting means therefor, a stretchable sleeve mounted within the said casing and extending normally over a peripheral portion of said closure member, the casing having end means having flow passages therethrough for mounting said sleeve against axial movement within said casing, the casing having vent means to atmosphere, the said end means cooperating with the said closure member to guide the latter member during the course of its movement within the casing in response to line flow.

10. The combination in a fluid responsive lift check valve, a body, a reciprocably movable closure member therefor guided within said body against transverse movement, a distortable bellows snugly normally engaging a laterally extending narrow portion of the closure member in the closed position of the valve thereby to cooperate with the said closure member in shutting off fluid flow therepast when the latter member is in its seated position in the said body, the body having vent means to atmosphere, the portion of the said bellows snugly engaging a narrow portion of the said closure member being predeterminedly movable from such engagement in response to fluid flow within the body to engage the walls of an enlarged chamber therewithin.

GEORGE HANSEN.

REFERENCES CITED

The following references are of record in the file of this patent:

UNITED STATES PATENTS

| Number | Name | Date |
|---|---|---|
| 1,045,404 | Hottenroth | Nov. 26, 1912 |
| 2,026,916 | Smith | Jan. 7, 1936 |
| 2,247,363 | Dunn | July 1, 1941 |

FOREIGN PATENTS

| Number | Country | Date |
|---|---|---|
| 1,909 | Great Britain | of 1899 |